Aug. 18, 1936.　　　　L. L. CUSTER　　　　2,051,289
POWER TRANSMISSION
Original Filed Aug. 11, 1933　　3 Sheets-Sheet 2
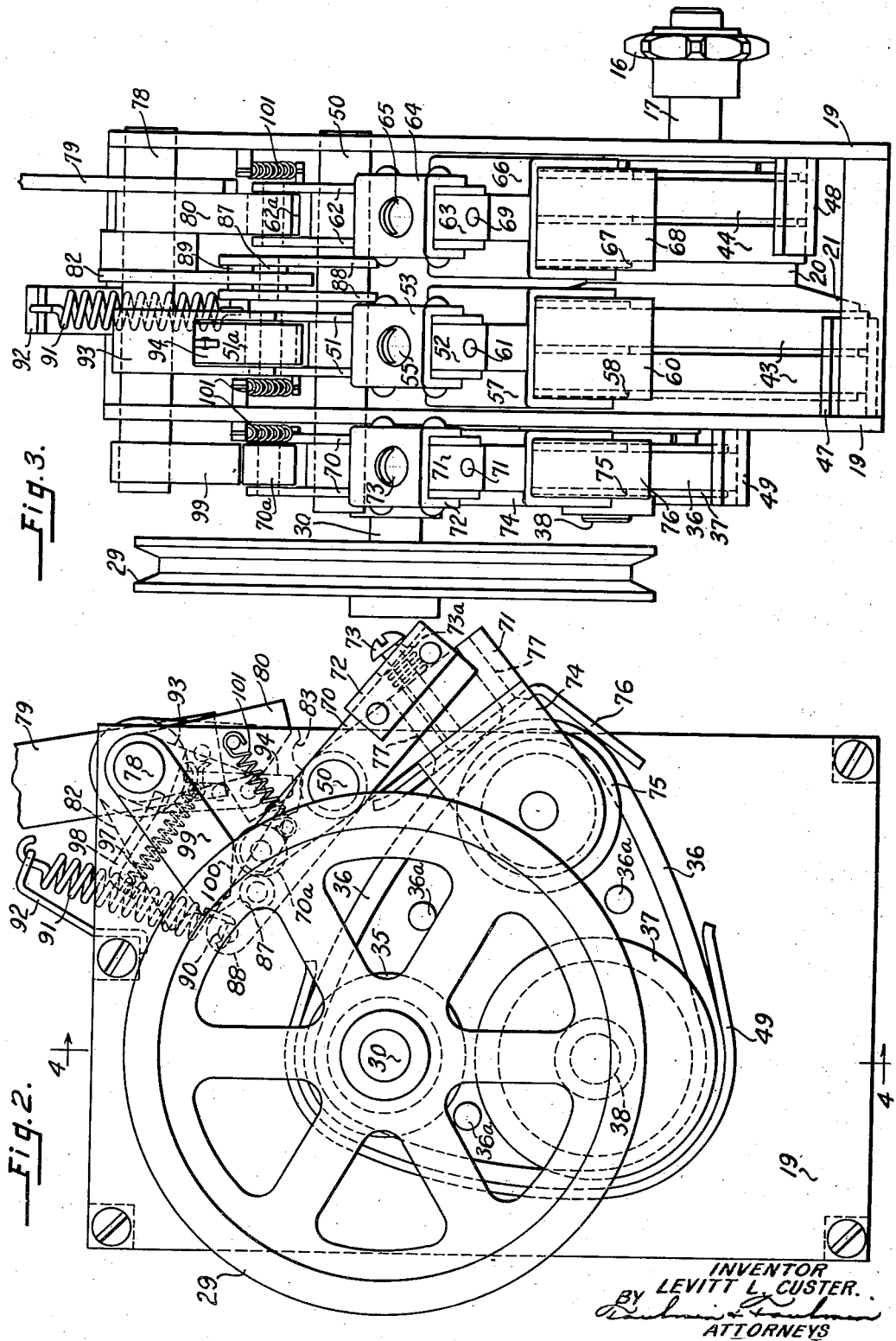
INVENTOR
LEVITT L. CUSTER.
BY
ATTORNEYS Aug. 18, 1936.  L. L. CUSTER  2,051,289

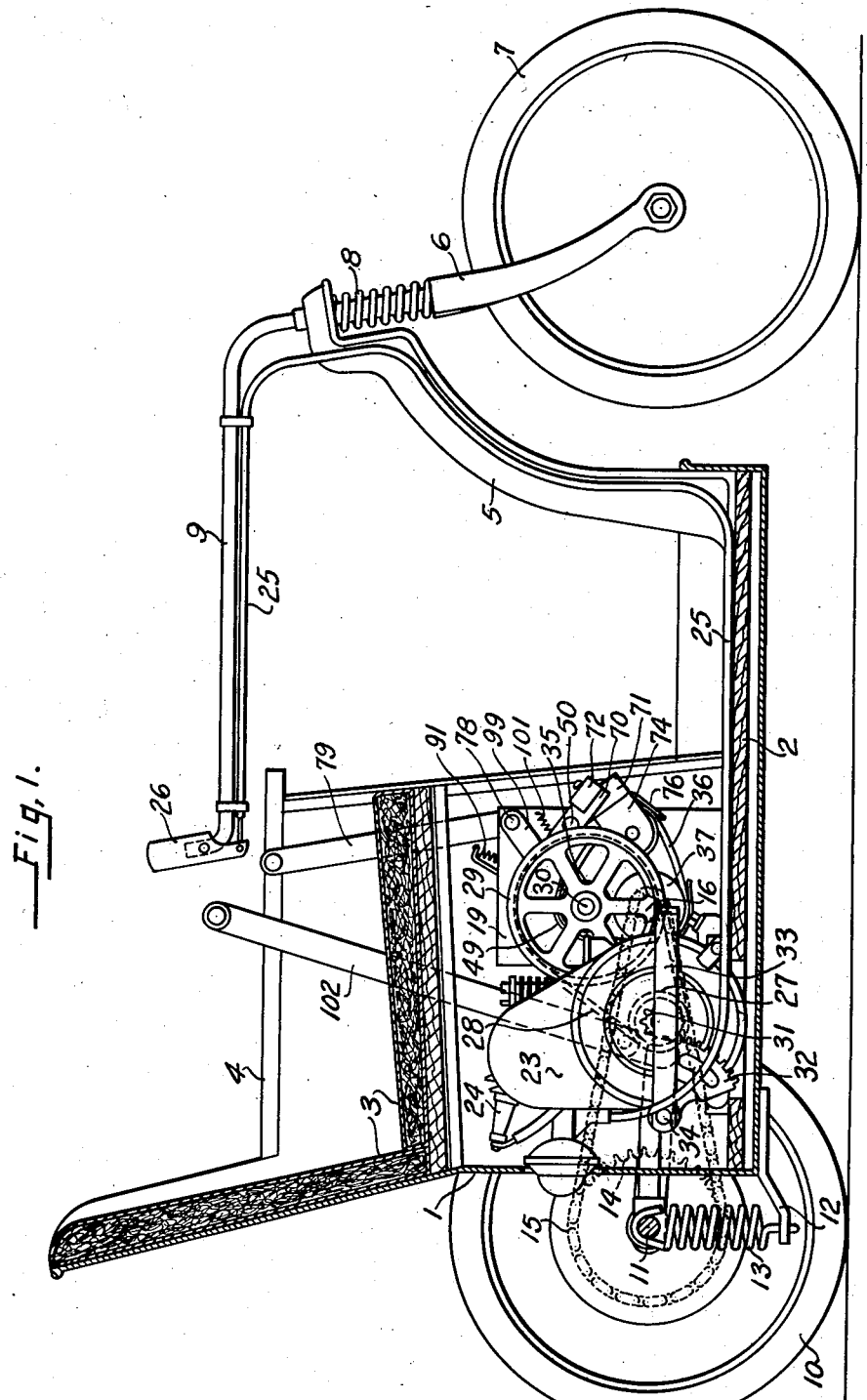

POWER TRANSMISSION

Original Filed Aug. 11, 1933   3 Sheets-Sheet 3

INVENTOR
LEVITT L. CUSTER.
BY
ATTORNEYS

Patented Aug. 18, 1936

2,051,289

UNITED STATES PATENT OFFICE 2,051,289

POWER TRANSMISSION

Levitt L. Custer, Dayton, Ohio

Application August 11, 1933, Serial No. 684,711
Renewed May 12, 1936

3 Claims. (Cl. 74—218)

This invention relates to improvements in power transmission, and has for its object to provide, in connection with an invalid car, a transmission forming part of the connection between the motor and one of the axles of the car, by which the car may be moved forward at various speeds and may be reversed.

It is particularly the object of this invention to provide a power transmission adapted to be adjusted for various speeds by the operation of a single instrumentality.

It is an object of this invention to provide a power transmission consisting of a plurality of driving means, and means to selectively bring said means into operation.

It is particularly an object of this invention to provide a power transmission in which there are two shafts connected by a plurality of spaced belts, and means for selectively causing each of the belts to operate.

These and other advantages will appear from the following description taken in connection with the drawings.

Referring to the drawings:

Figure 1 is a vertical, longitudinal section through an invalid car to which applicant's power mechanism is applied.

Figure 2 is a side elevation of a casing supporting the power transmission, showing a part of the mechanism associated therewith.

Figure 3 is a view taken at right angles to Figure 2.

Figure 5:
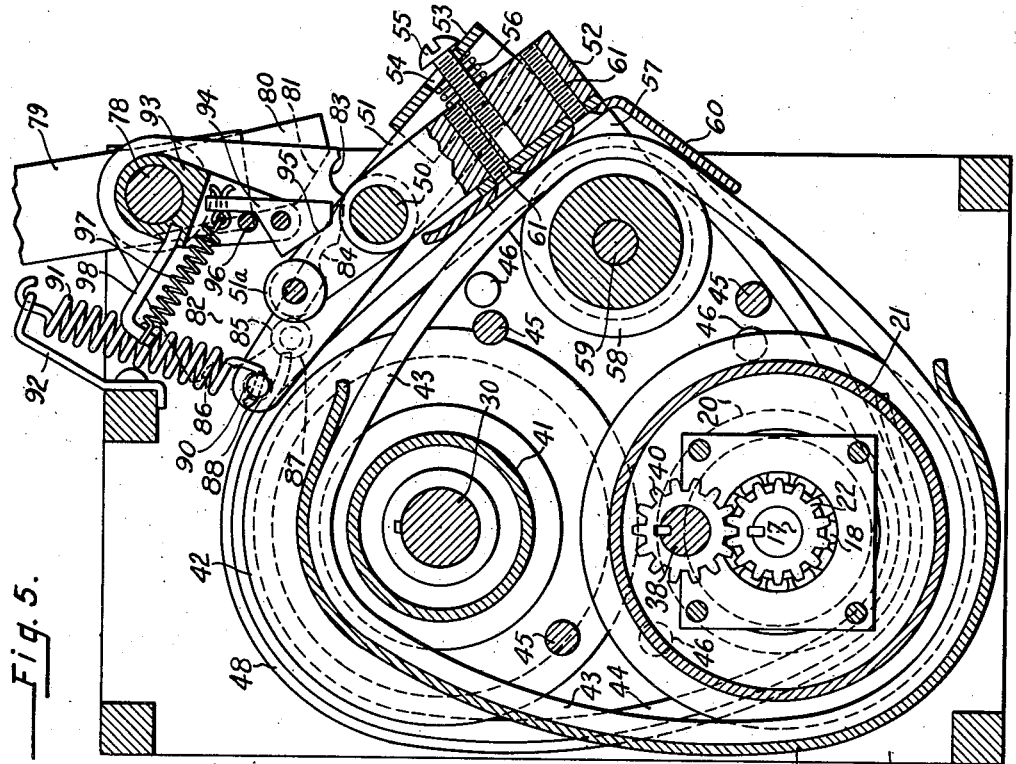
Figure 5 is a section on the line 5—5 of Figure 4.
Figure 4:
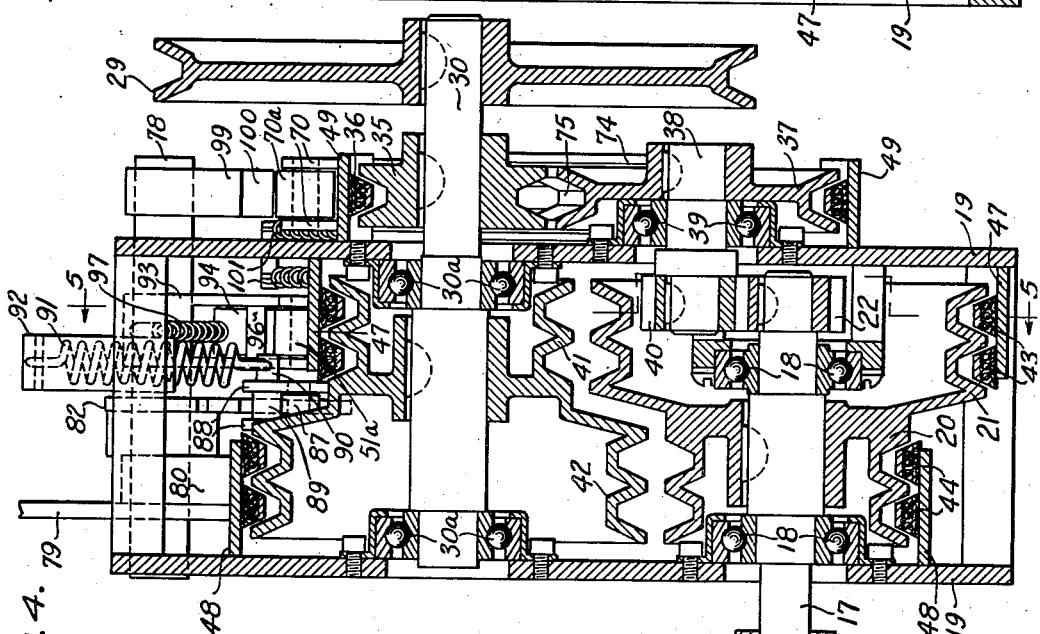
Figure 4 is a section on the line 4—4 of Figure 2.

The power transmission, the subject of the present application, is adapted to be used for the purpose of transmitting power from the source to some driven element, and by way of illustration is shown attached to an invalid car which has a body 1, a floor 2, a seat and back 3 and side arms 4.

Extending upwardly and forwardly from the front end of the body is a bracket 5 which has a hole therein to receive the upper end of a yoke 6, which is supported by means of a wheel 7. Between the bracket and the part of the yoke immediately above the wheel is a spring 8 for resiliently supporting the front end of the body on the wheel and yoke. The yoke above the bracket extends rearwardly to form a steering handle 9, the free end of which extends above the front edge of the seat and is provided with a lever 26, the purpose of which will be later described.

The rear of the body is supported by means of two wheels 10 and an axle 11, through the instrumentality of a pair of arms 12 and springs 13. Each arm is attached at one end to the body and at its other end to one end of one of the springs, while the other end of the spring is attached to the axle. On the axle is a sprocket 14, about which there is a chain 15 extending to a sprocket 16 located on the shaft 17 supported in bearings 18 in a casing formed with two side plates 19.

The sprocket 16 is without the casing and on one end of the shaft 17, while within the casing and on the shaft 17 is a double pulley, composed of a small high speed pulley 20 and a larger low speed pulley 21. Within the larger pulley and on the end of the shaft 17 from the sprocket 16 is a pinion 22, which meshes with a second pinion, later to be described. Suitably supported adjacent the casing is a motor 23, which has the usual spark plug 24. Extending from the intake part of the motor to the lever 26 is a Bowden wire 25, which is operated by the lever 26 for controlling the admission of fuel to the motor.

On the motor shaft is a pulley 27 over which a belt 28 passes to a larger pulley 29, located on one end of a shaft 30 without the casing. The shaft 30 is supported by bearings 30a on the plates 19. The motor shaft also has thereon a pinion 31 engaged by a toothed quadrant 32, attached to a lever 33 pivotally mounted on a pivot pin 34 supported on some part of the car frame. Whenever it is desired to start the motor the lever is pulled up by hand, whereby the motor shaft is caused to rotate for starting purposes.

On the shaft 30, without the casing and adjacent the pulley 29, is a small pulley 35, which is connected by means of a belt 36 to another pulley 37 located on one end of a short shaft 38, supported in roller bearings 39 in one of the plates 19. The pulleys 35 and 37 and the belt 36 are for reversing the movement of the car. On the end of the shaft 38, remote from the pulley 37, is a pinion 40 which meshes with the pinion 22 on one end of the shaft 17. On the shaft 30, between the two side plates 19, is a pulley structure composed of a small low speed pulley 41 and a large high speed pulley 42. The belt 36 has guide pins 36a between its pulleys.

These pulleys, as well as pulleys 20 and 21, are provided with two grooves in which V-shaped belts work. In the grooves of the pulleys 21 and 41 are V-shaped belts 43, while in the grooves of the pulleys 42 and 20 are V-shaped belts 44.

The car has two forward and one rearward movement. The forward movements are brought about by the pulleys 42 and 20, 41 and 21, while the reverse movement is brought about by pulleys 35 and 37. The shafts 17 and 38 are driven in unison by means of pinions 40 and 22, and are used for reverse or backward movement of the car.

In order to prevent the belts 43 from locking and to hold them in proper adjustment with relation to all of the pulleys over which these belts pass, pins 45 mounted on the casing are provided, while similar pins 46 mounted on the casing are provided to prevent the belts 44 from locking with their pulleys. Closely adjacent the belts 43 and partly inclosing the pulleys 41 and 21 is a plate 47. This plate is so shaped that it will properly position and support the belts when they are not held tight against the pulleys. V-shaped belts, when not under tension assume a certain curved shape, and the curvature of this plate is such as to adapt itself to the natural curvature of the belts so the belts may be properly spaced from the pulleys when idle. A similar plate 48 is provided in connection with the belts 44 for supporting them, and a similar and correspondingly shaped plate 49 is used in connection with the single belt on the pulleys 35 and 37 for supporting it.

Supported in the front of the casing is a shaft 50. This shaft supports the various instrumentalities used for causing the belts to engage their pulleys for operating purposes. Near the center of this shaft is attached a pair of levers 51, which have therebetween, at one end, a roller 51a. Between these levers and pivotally mounted on the shaft at one end is an arm or lever 52. This arm has on its end, remote from the shaft, means for adjusting it with relation to the levers, said means consisting of a U-shaped clip 53, attached to the levers, and a screw 55 passing through a slot 54 in the clip into the arm. Between the arm and the clip, around the screw, is a spring 56.

In order to support a pulley 58 a yoke 57 is provided, which has two arms between which the roller is supported and operates by means of a shaft 59. Between the yoke and pulley 58 is a plate 60. This plate and the yoke are supported on the end of the arm by means of screws 61. The plate 60 extends down forwardly in front of the pulley 58 and cooperates in holding the belts 43 in the grooves of the pulley. This pulley 58 has two grooves that receive both of the belts 43.

On the shaft 50, between the levers 51 and one of the plates 19, is a second pair of levers 62 which carry a roller 62a, similar to the roller 51a. Between these levers, mounted at one end upon the shaft 50, is an arm or lever 63, which is adjusted at its other end by a U-shaped clip 64 on the levers and a screw 65 extending through a slot in the clip and spring, not shown but similar to the slot and spring shown in connection with the arm 52. On this arm is a yoke 66, which carries between its legs a pulley 67, provided with grooves therein for the belts 44. In connection with the yoke is a plate 68, similar to the plate 60 and supported, together with the yoke, on the end of the arm by means of screws 69.

On the shaft 50, without the casing and between one of the side plates 19 and the pulley 29, is a pair of levers 70, having thereon a roller 70a. Between these levers and pivoted at one end on the shaft 50 is an arm or lever 71, which is adjusted at its other end by a U-shaped clip 72 attached to the levers. This clip is provided with a slot to receive a screw 73 and which the arm may be adjusted with relation to the levers. This screw passes through the slot in the clip, into the arm.

Between the arm and the clip and surrounding the screw is a spring 73a, shown in dotted lines in Figure 2. To this arm is attached a U-shaped yoke 74 which carries between its arms a pulley 75, provided with a single groove for receiving the belt 36. Associated with this pulley 75 is a plate 76, which is attached to the arm together with the yoke by means of screws 77. This plate serves, in cooperation with the pulley 75, to hold the belt in position on the pulley.

Suitably mounted in the side plates and above the shaft 50 is a shaft 78, which has attached thereto an operating lever 79 and a cam arm 80. This lever, shaft and cam arm are formed integral so whenever the lever is operated the shaft rotates and moves the cam arm 80. This cam arm has on its lower end a high speed cam surface 81 adapted to engage the roller 62a on the levers 62 for the purpose of causing the pulley 67 to move to tighten the belts 44. When these belts 44 are in operation the power mechanism is in position for high speed.

Also fixedly mounted on the shaft 78 is a quadrant 82, which is provided with four notches, one 83 for high speed purposes, another 84 for low speed purposes, and a third neutral notch 85 and a reverse notch 86. A pair of parallel arms 88, spaced from each other and each mounted at one end upon the shaft 50 have between their other ends a spacer 89 adjacent which and between the arms is a roller 87. This spacer has extending laterally from one side of one of the arms a pin or projection 90, to which is attached one end of a spring 91, the other end of which is attached to a bracket 92 supported in some suitable manner by the casing. This spring serves to hold the roller 87 in engagement with the quadrant so that the roller may be properly seated in any one of the notches, the particular notch depending upon the speed desired and the position of the lever 79.

There is also mounted on the shaft 78 a bifurcated bracket 93 which supports between its arms a cam dog 94, which has thereon a cam surface 95 adapted to engage the roller 51a. There is also provided adjacent the dog and between the arms of the bracket a pin 96. The dog remote from the cam surface has attached thereto one end of a spring 97, the other end of which is attached to a bracket 98 suitably supported on the bracket 93.

This cam dog serves to engage the proper roller 51a for operating the car at low speed, and is resiliently mounted in order that it may offer no obstruction to the operation of the lever for high speed purposes. On the shaft 78, between one of the side plates 19 and the pulley 29, is a cam arm 99 which has on its free end a cam surface 100, adapted to engage the roller 70a to operate the pulley to tension the belt 36 for reverse movement.

For the purpose of holding the various belt tensioning pulleys in a position so that the belts are loose, springs 101 are provided. There is one or more of these springs for the pulley and it is against the operation of these springs that the lever 79 acts to tension the various belts. There is provided in connection with the power transmission means a brake lever 102, which has attached thereto a suitable braking mechanism connected to the axle 11.

The driving connection between the shaft 17 and the shaft 30 is triple in its nature, there being a high speed connection and a low speed connection for forward movement and a reverse connection for backward movement. These connections are controlled through the operation of the lever 79, which is mounted upon the shaft 78 and operates the various instrumentalities for moving the movable pulleys. The shaft 78 has thereon the cam arm 80 with the cam surface 81 for engagement with the roller 62a for high speed forward movement. During the low speed forward movement the parts are held in one position by means of the quadrant 82 which has thereon a plurality of pockets or seats for receiving the roller 87. During the low speed forward movement the roller 87 engages the notch 84 in the quadrant. For high speed forward movement the roller 87 engages in the notch 83 in the quadrant. At this time the lever 51 is operated to move the pulley thereon by means of the cam surface 95 engaging the roller 51a. This cam surface 95 is on the cam dog 94.

In order to reverse the movement of the vehicle the lever 79 is shifted so that the roller 87 engages the notch 86 in the quadrant. At this time the lever 70 is operated to tension the belt 36. This is brought about by the roller 70a engaging the cam surface 100 on the cam arm 99. In the event it is desired to stop any movement of the vehicle the lever 79 is shifted so that the notch 86 in the quadrant 82 will engage the roller 87. Any desired movement of the vehicle is effected by the operation of the lever 79 in the manner just described.

It will be understood that I desire to comprehend within my invention such modifications as come within the scope of my claims and my invention.

Having thus fully described my invention, what I claim as new and desire to secure by Letters Patent is:

1. In a power transmission, a casing having side plates, a pair of shafts rotatably supported by said plates, each shaft having thereon a large pulley and a small pulley, each large pulley having a belt passing around it and one of the small pulleys, a third shaft on said side plates, a lever pivoted intermediate its ends on the third shaft, a roller on one end of the lever, an arm pivoted at one end on the third shaft, an adjustable connection between the other end of the arm and the other end of the lever, a pulley on the arm engaging one belt, a second lever pivoted intermediate its ends on the third shaft, a roller on one end of the second lever, a second arm pivoted at one end on the third shaft, a roller on one end of the second arm, a pulley on the other end of the arm engaging the other belt, an adjustable connection between the other end of the second arm and the other end of the second lever, and means to engage the rollers selectively to tension the belts.

2. In a power transmission, a casing having side plates, a pair of shafts rotatably supported by said plates, each shaft having thereon a large pulley and a small pulley, each large pulley having a belt passing around it and one of the small pulleys, a third shaft on said side plates, a lever pivoted intermediate its ends on the third shaft, a roller on one end of the lever, an arm pivoted at one end on the third shaft, an adjustable connection between the other end of the arm and the other end of the lever, a pulley on the arm engaging one belt, a second lever pivoted intermediate its ends on the third shaft, a roller on one end of the second lever, a second arm pivoted at one end on the third shaft, a roller on one end of the second arm, a pulley on the other end of the arm engaging the other belt, an adjustable connection between the other end of the second arm and the other end of the second lever, and means to engage the rollers selectively to tension the belts, said means comprising an arm having thereon a cam surface to engage one of the rollers and a cam member operatively connected to the arm to engage the other roller.

3. In a power transmission, a casing having side plates, a pair of shafts rotatably supported by said plates, each shaft having thereon a large pulley and a small pulley, each large pulley having a belt passing around it and one of the small pulleys, a third shaft on said side plates, a lever pivoted intermediate its ends on the third shaft, a roller on one end of the lever, an arm pivoted at one end on the third shaft, an adjustable connection between the other end of the arm and the other end of the lever, a pulley on the arm engaging one belt, a second lever pivoted intermediate its ends on the third shaft, a roller on one end of the second lever, a second arm pivoted at one end on the third shaft, a roller on one end of the second arm, a pulley on the other end of the arm engaging the other belt, an adjustable connection between the other end of the second arm and the other end of the second lever, and means to engage the rollers selectively to tension the belts, said means comprising a shaft having thereon an arm with a cam surface to engage one of the rollers and a pivoted cam member operated by the shaft to engage the other roller.

LEVITT L. CUSTER.